United States Patent

[11] 3,556,305

| [72] | Inventor | Jacob Shorr |
| | | Brighton, Mass. |
| [21] | Appl. No. | 717,039 |
| [22] | Filed | Mar. 28, 1968 |
| [45] | Patented | Jan. 19, 1971 |
| [73] | Assignee | Amicon Corporation |
| | | Lexington, Mass. |
| | | a corporation of Massachusetts |

[54] COMPOSITE MEMBRANE AND PROCESS FOR MAKING SAME
7 Claims, No Drawings

[52] U.S. Cl. .................................................. 210/490,
117/73, 117/76, 117/98, 117/83, 117/86, 210/500, 264/41, 264/49
[51] Int. Cl. ............................................................ B44d 1/14, B01d 39/00
[50] Field of Search ............................................. 210/321, 500, 490, 22, 23; 264/41, 49; 117/76F, 98

[56] References Cited
UNITED STATES PATENTS

| 2,960,462 | 11/1960 | Lee et al. ..................... | 210/321X |
| 3,022,187 | 2/1962 | Eyraud et al. ................. | 117/16 |
| 3,331,772 | 7/1967 | Brownscombe et al. ....... | 210/23 |
| 3,417,870 | 12/1968 | Bray ............................ | 210/321 |
| 3,462,362 | 8/1969 | Kollsman...................... | 210/321X |

OTHER REFERENCES

Monsanto. Investigation and preparation of polymer films to improve the separation of water and salts in saline water conversion. U.S. Dept. of Interior, Office of Saline Water. R & D Progress Report No. 69, Dec. 1962, PP. 41—42.

Merten et al. Research and Development on Reverse Osmosis Membrane Modules. U.S. Dept. of Interior, Office of Saline Water, R & D Progress Report No. 165, Jan. 1966, pp. 1—3.

Francis et al. Second Report on Fabrication and Evaluation of New Ultrathin Reverse Osmosis Membranes. U.S. Dept. of Interior, Office of Saline Water, R & D Progress Report No. 247, April 1947, pp. 46—47.

*Primary Examiner*—Willaim D. Martin
*Assistant Examiner*—Ralph Husack
*Attorney*—R. W. Furlong ABSTRACT: A novel membrane suitable for use in reverse osmosis and related separation processes, said membrane comprising (a) an anisotropic membrane comprising a thin microporous barrier skin and a thicker macroporous support layer, (b) a very thin layer of a film forming adhesive polymer over the barrier skin of hydraulically porous substrate and (c) a very thin diffusive type membrane film overlying said adhesive polymer and bound to said porous substrate by said adhesive polymer.

COMPOSITE MEMBRANE AND PROCESS FOR MAKING SAME

BACKGROUND OF THE INVENTION

For some time, investigators active in the membrane art have attempted to solve the problem of forming reasonably strong membranes obtaining maximum diffusion activated separation by forming bifunctional membranes usually of an ultrathin diffusion barrier supported on a thicker, and more rugged, substrate which provides less resistance to flow than does the diffusion barrier. Among such attempts are those disclosed in U.S. Pat. No. 2,960,462 to Lee et al., wherein a very thin film of polymer is coated on a slightly more permeable polymer to form a diffusion membrane; in U.S. Pat. No. 3,022,187 to Eyraud et al., wherein a metallic oxide film at or near one surface of a metallic substrate forms a relatively tight barrier; in U.S. Pat. No. 3,335,545 wherein Robb et al. disclose use of a thin liquid film over a porous substrate to obtain gas separation; and in U.S. Pat. No. 3,225,107 wherein Kirland et al. disclose grafting a thin polymeric coating on at least one side of a polymeric membrane. Moreover, a considerable amount of work has been done on so-called "dynamically formed" membranes, i.e., membranes formed by taking a relatively porous substrate and continuously coating the substrate with a polymeric film material which is maintained in dilute solution in the liquid mass being subject to separation. This continuous deposition is required because the polymeric film is subject to being carried into the pores and through the porous substrate. Moreover, the films which are sufficiently soluble in the liquid mass being separated are usually subject to lateral erosion in continuous process devices. The problems associated with the formation of "dynamically formed" membranes are indicative of the problems generally encountered by those trying to form an ultrathin diffusive polymer on a hydraulically porous substrate.

By hydraulically porous substrate is meant one whose minimum average pore size is about 10 angstroms, thus making it permeable to fluid flow without regard to material of construction. The term is meant to exclude substrates which are substantially pore free and which permit the selective passage of molecules largely by activated diffusion and like processes.

Therefore, it is an object of the instant invention to provide an improved membrane comprising a thin diffusion layer on hydraulically porous substrate.

It is a further object of the invention to provide an improved membrane for reverse osmosis separations having a surprisingly advantageous ratio of liquid flux to solute retentivity.

Another object of the invention is to provide a novel process for binding a diffusion membrane layer to a hydraulically porous substrate.

It is a further object of the invention to provide an improved method for forming a membrane dynamically.

Other objects of the invention will be obvious to those skilled in the art on their reading of the instant application.

SUMMARY OF THE INVENTION

The present invention has achieved these objects by forming a novel tripartite membrane comprising a selected anisotropic porous substrate, an ultrathin adhesive layer over the porous substrate, and a thin diffusive membrane formed over the adhesive layer and bound to the substrate by the adhesive layer.

The adhesive polymer is conveniently coated on the substrate by dipping the selected porous substrate into a dilute solution of the adhesive polymer or otherwise forming a thin coat under low-pressure conditions whereby the adhesive polymer is largely retained on the substrate surface, not pushed into the pores thereof. For this reason, adhesive polymers which are sparingly soluble in water are most easily utilized. Since many separation processes involve the diffusion of water through a membrane, such water soluble adhesive polymers also provide in most cases the least resistance to the desired flow properties of the finished membrane. However, when separations which do not involve the transmission of water are to be carried out, the adhesive polymer may be selected for its solubility in some other vehicle for deposition upon the porous substrate.

By adhesive layer is meant a very thin layer, not more than about 1500 angstroms, preferably less than 500 angstroms, in thickness, of a substance capable of holding materials together by surface attachment. More particularly, the adhesive must be such that (1) it is capable of acting as a holding adhesive, i.e., capable of attaching one adherent to another and holding them in place and (2) it is capable of acting as a sealing adhesive wherein it provides a joint between the two adhesives which, in effect, aids in sealing the adjacent surface of the anisotropic porous substrate adherent. Such an adhesive coat is believed to function not only as a means for bonding the diffusive membrane formed thereover to the substrate, but also is believed to form a protective coating over the substrate which prevents the diffusive membrane material from itself getting into the pores of the substrate.

Selection of the particular adhesive, of course, must be made with particular attention not only to the nature of the surface of the adherent, but to whether or not it is adapted for deposition in a very thin layer. For this reason, adhesives which are soluble in a liquid vehicle from which they may be deposited are particularly useful. Moreover, polymeric adhesive solutes have been found to form the most versatile and suitable adhesive layer. These adhesives are often of the type which form coordinate covalent bonds, such as hydrogen bonds, with materials containing hydroxyl or carboxyl groups. Often this coordinate covalent bonding is of relatively high importance in forming a suitable bond between the adhesive and the diffusive polymer layer coated thereover than between the adhesive and the porous substrate where mechanical adhesion due to interlocking of the adhesive and substrate often allows a suitable bond. However, often van der waals forces, covalent bonds and the like play important roles in maintaining a useful adhesive bond.

It is generally preferred to have each of the substrate, adhesive, and diffusive polymer formed of organic polymeric material each of which material does not have a secondary transition temperature in the temperature range in which the membrane is intended to be used in separation processes. This is to minimize the possibility that differences in thermal expansion coefficients between the various layers of the composite layer will mechanically disrupt any of the component layers.

One procedure which has been found to be particularly advantageous is to use as an adhesive layer a polymeric adhesive which has only sparing solubility in the primary liquid of the medium to be subjected to processing. This usually assures the continued adhesive quality of the adhesive layer throughout the contemplated life of the membrane.

Poly(methyl vinyl ether/maleic anhydrides) sold under the trade designation Gantrez AM by General Aniline & Film Corp. are useful adhesive polymers. Conveniently used is Gantrez AN-139 of specific viscosity of about 1 to 2. Solutions of this material are compatible with solutions of other useful adhesive polymers such as sodium polyacrylate sold under the trade designation "Acrysol" by Rohm & Haas Co.; such naturally derived products as albumin, sodium alginate, sodium carboxymethyl cellulose, starch, oxidized starch, dextrin, casein; carboxyvinyl polymers such as those sold under the trade name "934" by Goodrich Chemicals, Inc., hydroxyethyl cellulose; dimethylhydantoin formaldehyde resin; polyvinyl alcohol; methyl cellulose; the phenol formaldehyde resins sold under the trade name "Plyophen P-398" by Reichold Chemical Co.; "Polyox" WSR-35 and WSR-70 sold by Union Carbide Corp. which are poly(ethylene oxide); poly(vinyl methyl ether), polyvinyl pyrrolidone; vinylpyrrolidone/vinyl acetate copolymer; polyacrylamide such as sold by Dow Chemical Co. under the trade designation "Separon NP-20"; the styrene/maleic anhydride copolymer sold under the trade designation Stymer S by Monsanto Chemical Co.; and the like.

The synthetic and natural polymers in the aforesaid list are typical of adhesive polymers which may be utilized in the practice of the invention. The precise selection of an adhesive polymer will be made with reference to the chemical nature of the porous substrate and the material from which the overlying diffusion polymer is to be prepared. Coatings of the adhesive polymer are normally not more than about a molecular layer or two thick, i.e., as thin as possible but sufficiently thick to provide an effective boundary layer between the porous support and the diffusion membrane to be deposited over the adhesive area.

The diffusion-type membrane film which is adhesively bonded to the anisotropic porous substrate by an adhesive polymer may be formed of any of the organic or inorganic, polymer or gellike, film forming materials known to the art. For example, most of the polymers which have been used in the forming of "dynamically formed" membranes can be used. In the process according to the instant invention and in articles formed thereby such polymers and gellike materials need not be constantly replaced because they are not at all swept through a porous substrate. Moreover, because of the adhesive polymer layer over the anisotropic porous substrate, a very thin film of the polymer or gel can be fixed at the surface and it is not subject to severe erosion by process fluid as would be the case were there no bond with the adhesive layer. Utilizing this aspect of the invention with aqueous systems, it is most advantageous that the adhesive layer be more soluble than the diffusive-type membrane film mounted thereover. In this way the advantage of an adhesive capable of promoting optimum diffusive flow of water can be achieved without exposing the membrane to the highly mobile liquid moving in the cell in which the membrane is mounted. The composite thickness of adhesive and overlying membrane is less than 2 microns and most advantageously less than 2,000 angstroms.

Such materials as the hydrous oxides of trivalent aluminum and iron, tetravalent silicon, zirconium, and thorium, and hexavalent uranium and other finely ground solids capable of forming gellike substances, for example clays such as bentonite and humic acid can be used. Polyelectrolytes, such as the polyanion, poly (styrene sulfonic acid), and the polycation poly (vinylbenzyltrimethyl ammonium chloride) can be used. Also found to be useful are cellulose acetate, hydrogen phthalate, cellulose acetate N.N-diethylamminoacetate, poly(4-vinyl pyridine), poly (4-vinyl pyridinum butyl) chloride and poly (vinyl pyrrolidone). There can also be used polyvinyl alcohol or a mixture of polyvinyl methyl ether with a copolymer of vinyl methyl ether with maleic anhydride. These materials are most advantageously coated on the adhesive polymer layer by "dynamically forming" the coating over the adhesive layer. This procedure wherein the material is dissolved in a dilute solution which is "filtered" through the membrane while the solute becomes attached to the adhesive layer, has been demonstrated to give superior distribution of the solute on the adhesive layer and, consequently, a superior membrane.

Thus, membranes formed according to the instant invention have a number of significant advantages over dynamically formed membranes of the prior art. First the nonerosive qualities thereof allow them to be used in processing a wide variety of solutions with no requirement that membrane forming polymer "makeup" be included in the solution. Secondly, they have operating characteristics relatively independent of concentration. This differs markedly from most dynamically formed membranes wherein the interstices of the porous substrate become coated with the membrane forming polymer, with the result that a Donnanexclusion-type action takes place, thereby making the separation efficiency dependent on maintaining a suitably low solute concentration in the feed.

Surprisingly, it has also been discovered that membranes of the instant invention wear and perform best in the thin channel systems known to the art which provide high velocity nonturbulent flow.

It is desireable to distinguish one basic membrane-type filter from the anisotropic porous membrane supports useful in the invention. This is the membrane of isotropic, sometimes called homogeneous, structure whose flow and retention properties are independent of flow direction. Such structures are typically produced in the form of sheets of from 0.1 to 0.010 inch in thickness. Most such membranes are analogous to conventional filters and are virtually nonretentive for solutes of molecular weight under about 1 million. A few such membranes are capable of retaining some larger protein molecules. When attempts are made to prepare such membranes having a capability of retaining much smaller molecules, large decreases in hydraulic permeability often occur. Such decreases result in too-low solvent flow rates, through the membrane or restrict the usage of these isotropic membranes to a relatively few practical applications. Moreover, such isotropic membranes are susceptible to relatively easy plugging by trapped solutes. In some membranes of this type, usually those which have relatively small pore sizes, some small degree of anisotropy is achievable, but such membranes do not function properly when utilized in this invention.

The porous substrate should be a highly anisotropic and porous membrane of the type described in the commonly owned and copending patent applications, Ser. No. 669,648 filed Sept. 21, 1967 by Alan S. Michaels, now abandoned, and Ser. No. 545,298 filed on April 26, 1966 by Peter N. Rigopulos, the latter now abandoned and replaced by Ser. No. 850,263 filed Aug. 14, 1969. The former application is entitled High Flow Membranes; the latter application is entitled Permeable Membrane and Method of Making and Using Same. Such membranes are advantageous because they combine, in an integral substrate member (1) a barrier skin on one side thereof which has sufficiently small micropores to form a highly desirable "surface" on which to form—and retain—the adhesive polymer film and (2) a macroporous substructure which offers no significant additional resistance to liquids which pass the aforesaid barrier layer, but does provide mechanical support for the integral barrier layer and subsequently coated polymer layers superimposed upon it.

The anisotropic porous substrates which are most advantageously utilized have distinctive barrier skins of from about 0.1 to 5 microns in thickness. The average pore size is in the millimicron range, i.e. from 10 angstroms to 1,000 angstroms. Surfaces having pore sizes in this range provide the most suitable method of maintaining the membranes operating characteristics for prolonged periods of operation. These highly anisotropic membranes are to be carefully distinguished over some membranes presently on the market which are alleged to possess some degree of anisotropy, but which are in fact far more closely related in pore size, gradient of pore side from one face of the membrane to the other, and operating characteristics to the isotropic membranes described above. One such membrane which may have a slight anisotropic character is that sold under the trade designation MF-Millipore.

These anisotropic porous substrates useful in the present invention are highly anisotropic, submicroscopically porous, membranes formed of polymers having good mechanical integrity, most advantageously those crystalline and/or glassy thermoplastic polymers known to the art. These supports are described in the commonly owned and copending U.S. Pat. application, Ser. No. 669,648. By crystalline and glassy polymers are meant those materials which possess from about 5 to 50 percent by weight crystallinity as measured by X-ray diffraction techniques known to the art and/or a glass transition temperature (Tg) of at least about 20° C. Particularly advantageous are polymers of inherently low water sorptivity, which unlike the cellulose acetate materials known to the membrane art may be allowed to dry during storage without losing their beneficial mechanical and processing characteristics. These polymers are those having water absorptivities of less than about 10 percent by weight of moisture at 25° C., and 100 percent relative humidity.

Such anisotropic membranes are prepared by:
1. forming a casting dope of a polymer in an organic solvent;
2. casting a film of said casting dope;

3. preferentially contacting one side of said film with a diluent characterized by a high degree of miscibility with said organic solvent and a sufficiently low degree of compatibility with said casting dope to effect rapid precipitation of said polymer; and
4. maintaining said diluent in contact with said membrane until substantially all said solvent has been replaced with said diluent.

The submicroscopically porous anisotropic membranes described in the copending application consist of a macroscopically thick film of porous polymer, usually more than about 0.002 and less than about 0.050 of an inch in thickness. One surface of this film is an exceedingly thin, but relatively dense barrier layer or "skin" of from about 0.1 to 5 microns thickness of microporous polymer in which the average pore diameter is in the millimicron range, for example from 1 to 1,000 millicrons—i.e., about one-tenth to one-hundredth the thickness of the skin. The balance of the film structure is a support layer comprised of a much more coarsely porous polymer structure through which fluid can pass with little hydraulic resistance. When such a membrane is employed as a "molecular filter" with the "skin side" in contact with fluid under pressure, virtually all resistance to fluid flow through the membrane is encountered in the "skin," and molecules or particles of dimensions larger than the pores in the "skin," and molecules or particles of dimensions larger than the pores in the "skin" are selectively retained. Because the skin layer is of such extraordinary thinness, the overall hydraulic resistance to fluid flow through the membrane is very low; that is, the membrane displays surprisingly high permeability to fluids.

Some such membranes are obtainable from Amicon Corp. under the trade designation Diaflo XM-50. The procedure used in forming the porous substrate used in the illustrative working example follows:

30 grams of a polysulfone polymer sold by 3M Co. under the trade designation Polymer 360, was dissolved at about 50° or 60° C. in 100 cc. of dimethylsulfoxide (DMSO). The resultant solution was cooled to about 25° C. and centrifuged down to remove any sedimentary matter therefrom. Next, the solution was drawn down into a film 12 mils thick. This casting was done on a clean glass surface with the edges of the casting overlying a taped perimeter which is to provide means to assist in removing the casting from the glass without tearing it.

The casting was allowed to level for 1 minute and then submerged into a gently circulating water bath for a period of about 20 minutes. This water bath is maintained at about 25° C. Next, the resulting membrane was stripped off the glass plate and cut into the desired membrane shape.

The membrane so formed was found to reject completely a polysaccharide of about 100,000 average molecular weight, to reject about 75 percent of a polysacchardie having about a 20,000 molecular weight. These rejections were measured with 1 percent aqueous solutions under 50 p.s.i.g. operating pressure and at about 30° C. At 100 p.s.i.g. applied pressure and 25° C. the membrane exhibited a flux of about 50 gallons per square foot per day to distilled water.

The material Polymer 360 is particularly advantageous for use because, it has been discovered, the rheological properties of this polymer allow the formation of a porous network having an unusually high hydraulic permeability and yet being highly retentive of macromolecular solutes. This polymer is a thermoplastic having a chain formed of diphenyl and phenyl groups which groups are linked by sulfone groups and oxygen atoms. The inherent viscosity of the material is 0.42 to 0.46 as measured in a 1 percent solution of the material in dimethylformamide.

The working examples which are set forth below were carried out in a so-called thin channel cell of essentially rectangular dimensions having ⅜-inch entrance and exit ports at either end thereof. Exposed membrane surface was 4.75 inches by 1.5 inches. Depth of the channel was 0.010 inch. Flow through the cell was maintained at about 100 cc. per minute or a flow velocity of 16 cm. per second.

EXAMPLE 1

An anisotropic membrane, formed of Polymer 360 as described above, was soaked for 4 hours in an aqueous solution containing 1,000 parts per million of poly(vinyl methyl ether) of the type sold under the trade designation Gantrez M-155 by General Aniline & Film Corp. The membrane was then mounted in a stainless steel membrane separation cell with the barrier skin layer facing in what may be called the upstream direction.

An aqueous solution comprising 2,000 parts per million of a poly(vinyl alcohol) sold under the trade designation Elvanol 50-42 by E. I. DuPont de Nemours & Co., Inc., was prepared. A pressure of 100 p.s.i.g. was exerted on the solution as it was "filtered" through the adhesive coated anisotropic membrane for 30 minutes. During this period a thin diffusive membrane of poly(vinyl alcohol) formed over the adhesive.

After a 30 minute period, the system was flushed and a 1 percent aqueous sugar solution was passed through the resultant membrane at 1,500 p.s.i.g. The object of this experiment was to evaluate the effect of the membrane in retaining sugar while passing water therethrough. The test was run over a period of 15 hours during which retentions of 85 percent to 92 percent sugar were achieved with an average water flux of about 50 gallons per square foot per day.

EXAMPLE 2

An anisotropic membrane of the type described in Example 1 was soaked for 2 hours in a solution containing 1,000 parts per million poly(vinyl methyl ether) sold under the trade designation Gantrez 155 by General Aniline & Film Corp.

The membrane was mounted as before and an aqueous polymer solution comprising 1,000 parts per million of poly(methyl vinyl ether/maleic anhydride) sold under the trade designation Gantrez AN-139 by General Aniline and Film Corp. and 200 parts per million of the aforesaid poly(vinyl methyl ether) was passed therethrough for 30 minutes. After the system was flushed with water, and a 2 percent sugar solution was passed therethrough at 1,500 p.s.i.g. About 85 percent of the sugar was retained. Flux rates were maintained at 94 gallons per square foot per day over the 15 hour test period.

EXAMPLE 3

The same membrane preparation procedure was followed as in Example 2. Instead of a sugar solution, however, a 0.5 percent salt solution was passed through the membrane. Eighty percent of the salt was retained and a flux rate of 125 gallons per square foot per day was achieved.

I claim:

1. A membrane suitable for use in ultrafiltration, reverse osmosis, and other such separation processes, said membrane comprising:
   1. a porous substrate formed of a highly anisotropic polymeric membrane having a. a barrier layer at one surface thereof comprising micropores from 15 to 1,000 angstroms in diameter and having a thickness from about 0.1 to 5 microns and b. a macroporous support layer;
   2. an adhesive polymeric layer having a maximum thickness of about 1,500 angstroms coated on said substrate; and
   3. a diffusive polymer or gellike film bonded to said barrier layer of said porous substrate by said adhesive layer.

2. A membrane as defined in claim 1 wherein the maximum thickness of said adhesive polymeric layer is about 500 angstroms.

3. A membrane as defined in claim 1 wherein said adhesive layer consists of an alkyl vinyl ether polymer or copolymer.

4. A membrane as defined in claim 1 wherein said diffusive film is polyvinyl alcohol or a mixture of polyvinyl methyl ether with a copolymer of methyl vinyl ether with maleic anhydride.

5. A membrane as defined in claim 1 wherein the composite thickness of said adhesive layer and a diffusive film overlying said layer is less than about 2 microns.

6. A membrane as defined in claim 1 wherein said porous substrate is formed of a polysulfone polymer.

7. A process for making a membrane suitable for use in ultrafiltration, reverse osmosis, and other such separation processes which comprises providing a porous substrate formed of a highly anisotropic polymeric membrane having a. a barrier layer at one surface thereof comprising micropores from 15 to 1,000 angstroms in diameter and having a thickness from about 0.1 to 5 microns and b. a macroporous support layer, coating said substrate with a solution of an adhesive polymer to thereby deposit on the surface of the substrate an adhesive polymeric layer having a maximum thickness of about 1,500 angstroms, and filtering through said substrate from the surface having the barrier layer a dilute solution of polymer or gellike material to form a diffusive film bonded to said adhesive layer.

UNITED STATES PATENT OFFICE
CERTIFICATE OF CORRECTION

Patent No. 3,556,305                    Dated January 19, 1971

Inventor(s)   Jacob Shorr

It is certified that error appears in the above-identified patent and that said Letters Patent are hereby corrected as shown below:

Column 1, line 20, "Kirland" should read -- Kirkland --.
Column 2, line 65, after "trade name" insert -- Carbopol -
Column 5, line 17, "millicrons" should read -- millimicron
line 54, "polysaccharide" is misspelled; Column 6, line 66
"gellike" should read -- gel-like --. Column 8, line 8,
"gellike" should read -- gel-like --.

Signed and sealed this 4th day of May 1971.

(SEAL)
Attest:

EDWARD M.FLETCHER,JR.                    WILLIAM E. SCHUYLER, J
Attesting Officer                        Commissioner of Patent